United States Patent [19]

Witmer et al.

[11] Patent Number: 5,360,466
[45] Date of Patent: Nov. 1, 1994

[54] FERTILIZER PRODUCT AND PROCESS FOR MAKING SAME

[76] Inventors: Arthur L. Witmer; Noraneen Witmer, both of 5580 Hamill Ave., San Diego, Calif. 92009

[21] Appl. No.: 20,429

[22] Filed: Feb. 22, 1993

[51] Int. Cl.$^5$ .................................. C05F 3/00
[52] U.S. Cl. .................................. 71/15; 71/21
[58] Field of Search ............... 71/1, 11, 12, 13, 15, 71/21, 22

[56] References Cited

U.S. PATENT DOCUMENTS 1,496,834  6/1924  Thompson ...................... 71/21

OTHER PUBLICATIONS

Winterhalder et al, "Duny as . . . Community" pp. 89–104 1974.

*Primary Examiner*—Ferris Lander
*Attorney, Agent, or Firm*—Ralph Branscomb

[57] ABSTRACT

An organic, fresh-smelling fertilizer product is produced by collecting llama pellets from llamas that have preferably been fed only alfalfa hay with grain supplements. The pellets are first dried by means of a relatively slow process that enables them to harden as pellets rather than fragment, and they are then ground to produce a particulate mass such as powder, granulates or pellet-sized particles which has an alfalfa-like scent and is a very effective fertilizer.

7 Claims, 1 Drawing Sheet

FERTILIZER PRODUCT AND PROCESS FOR MAKING SAME

BACKGROUND OF THE INVENTION

Fertilizers and soil enriching materials are produced in a range of enriching ingredients. Some such products are mainly soil fillers, and others can be classified as fertilizers.

Fertilizers contain percentages of nitrogen, phosphate and potassium, the constituents that plants need most to grow that is lacking in soil. These ingredients are found naturally in manure products, and are created by chemical processed as well although obviously the end product is not organic.

In addition to chemically produced fertilizers and manure products, sewer sludge is also used in a purified form for fertilizer. Different types of mulches represent a fourth group of products used as soil conditioners as well.

All of these products have their strengths and weaknesses. Natural manure fertilizers generally have a bad aroma. Fish emulsion fertilizer is very rich, but probably has the worst smell of any of the fertilizers.

Artificial fertilizers produced by chemical processes do not have offending odors, but may burn the plants they are intended to fertilize and do not appeal to many people who insist on having organic fertilizers.

Sewer sludge may not have a terribly offending odor considering its source, but the idea of using sewer sludge in a garden repels some people. This may be for good reason, inasmuch as there may be traces of heavy metals, or other toxic substances in sludge.

Organic fertilizers that are rich in the natural ingredients that fertilizers need, but do not have an offending aroma, are few and far between.

SUMMARY OF THE INVENTION

The instant invention is a fertilizer that fits the above description of being organic, high in plant nutrients and completely inoffensive, in fact having a rather pleasant, in its aroma.

The fertilizer product of the instant invention is essentially llama manure pellets which have been dried, subsequent to which they are ground to a powder or pellet form which is the final fertilizer product.

This product not only does not have an offending odor, it has a pleasant alfalfa aroma. In addition to its organic nature, it has a relatively high concentration of phosphate and potassium, and an ideal 2%-3% nitrogen, representing an ideal fertilizer product.

DETAILED DESCRIPTION OF THE PREFERRED EMBODIMENT

There are a number of variations of the process that is used to create the final product that is described and claimed herein. Most of these variations represent improvements to the basic process that make it even a more effective end product in its texture, aroma and in some cased in its level of nutrients.

At the outset of the process, llamas are required, or at least access to areas in which they are fed is needed. The inventors of the process disclosed herein keep a herd of llamas and have a special area in which they produce manure which is collected for subsequent processing. This area is first processed by vacuuming it to clear it of all plant life, so that there is nothing but hard dirt.

The llamas that use this area are very well treated and given a high-quality alfalfa hay diet with a grain supplement of various grains depending on the season. The llamas are not permitted to pull plant life from the ground inasmuch as the ground as previously been cleaned of all such plants, so that the manure. This diet control has been found to produce the best quality llama pellets for use in the process of making the fertilizer product.

It is advantageous to use llama pellets which have been urinated upon by the llamas. Because the llamas generally stand in one place when executing both bodily functions, it is easy to acquire llama pellets of this nature.

Figure 2:
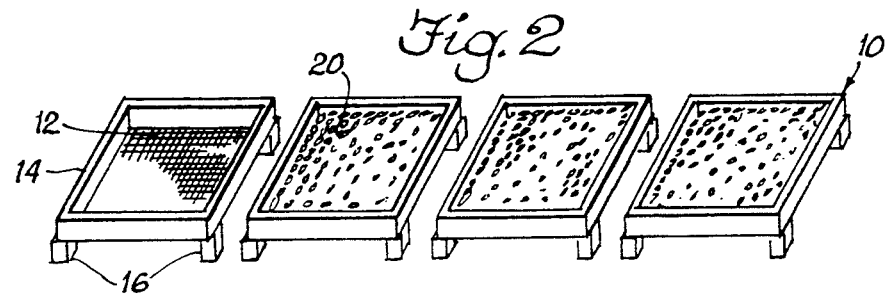
FIG. 2 illustrates a series of drying trays.

After the llama pellets have been produced by the llamas in the llama keeping area, those pellets which are more or less intact, as opposed to being fragmented, shattered or decomposed, are collected, after being left on the ground for at least 24 hours. The delay period permits them to partially dry so that they will not fall apart or fragment during the collection or subsequent drying processes. The pellets are gathered in baskets or other convenient containers, subsequent to which they are distributed on drying trays 10, illustrated in FIG. 2. On these drying trays, the llama pellets rest on a screen layer 12 which permits the free passage of ventilating air up through the pellets. A simple and nearly ideal way of making the trays is by making first, a square frame of 2×4's indicated at 14, and then nailing or otherwise attaching the screen 12 to one side. In its drying mode, the tray either has attached to it, or provided separately, four spacer blocks 16 for the obvious purpose of spacing the trays from the ground, if, as is intended, the drying takes place outdoors.

Figure 4:
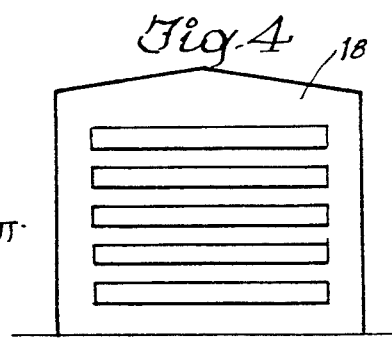
FIG. 4 is a diagrammatic view of the instant inside of a drying shed or oven having drying tray support racks.
Figure 5:
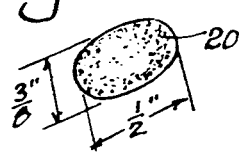
FIG. 5 illustrates the shape of a typical llama pellet.
Figure 7:
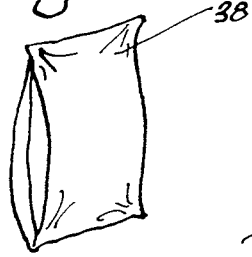
FIG. 7 illustrates the final product as it appears in its sacked form.

Alternatively, the trays could be placed in stacks in a drying shed or oven 18, diagrammatically illustrated in FIG. 4.

Figure 3:
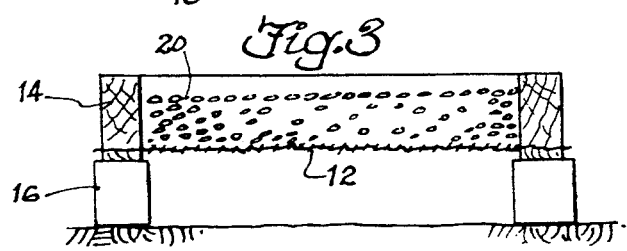
FIG. 3 is a transverse section taken through one of the drying trays.

In any event, the pellets 20 are filled into the drying trays until they are 2" to 4" deep as illustrated in FIG. 3. Periodically over the course of several days, the pellets are rotated and turned over to insure that the drying takes place evenly and substantially completely throughout the layer of pellets.

At the end of the drying process, that is, when the pellets are fully dry, they have a relatively hard shell that has developed in the drying process. This texture is ideal for grinding.

As each tray is emptied and the pellets are taken to the grinding and packaging stages of the process, a new batch of pellets that has been produced by the llamas is collected as described above and put into the tray. The process is thus continuous, with the trays being substantially continuously in use in an ongoing production process.

Figure 1:
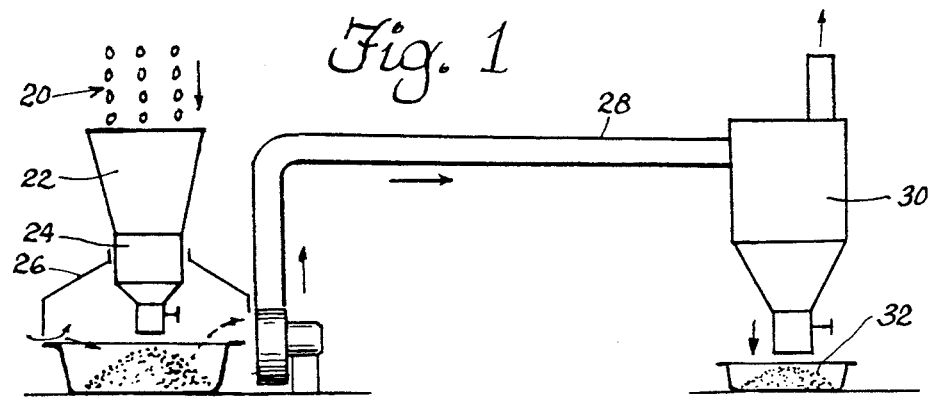
FIG. 1 is a diagrammatic view of the physical plant of the invention, illustrating the grinding of the dried pellets and the vacuuming of the airborne dust produced by the grinding process which is recycled into the fertilizer product.

The dry pellets are then taken to the grinding area as shown in FIG. 1. They are introduced into the hopper 22 of a grinder 24. It has been found in actual practice that a commercial grade coffee grinder works very well for grinding the pellets and produces a particulate mass of just the right texture needed for the final fertilizer product. The grinder also produces an airborne dust, which may be vacuumed from the processing area, shown enclosed within the hood 26, and forced through a duct 28 to a dust collector 30, which separates the dust from the air and outputs the solid product as non-airborne dust as shown at 32 in FIG. 1. This dust can be recombined with the final fertilizer product.

Figure 6:
FIG. 6 illustrates the final fertilizer product in powder and pellet form.

The final product is a fertilizer powder indicated at 34 in FIG. 6, although it can be produced in granular or pellet form as well, as indicated at 36. The same commercial grade coffee grinder used to make the powder can also be set to a coarser grind to produce granules or even pellets. The fertilizer is then packaged in bags 38 or any other container which is commercially practical.

The end market for the product is indoor house plants and small gardens for the most part, as opposed to large commercial growers. It is the market of people who are looking for an organic fertilizer which is high in nutrients and does not burn plants, but which is not offending in its aroma. This product fits that description very completely, and is expected to be very well received by the marketplace. When the llamas are properly fed, the fertilizer end product is ideal. Plants grown utilizing this fertilizer have demonstrated remarkable leaps of growth and development after application of the product around its stem and root area.

It is hereby claimed:

1. A method of producing organic fertilizer from llama pellets comprising the following steps:

(a) restricting the diet of llamas used to produce the pellets to alfalfa hay with a grain supplement;
   (b) waiting at least 24 hours after the pellets are deposited on the ground in the llama area before collecting same, to allow same to solidify adequately to permit their transport to a drying area intact;
   (c) collecting said llama pellets;
   (d) placing said llama pellets on at least one screen-bottomed horizontal ventilated tray, to a depth of between two inches and four inches for drying;
   (e) periodically turning the pellets over to promote even drying; and,
   (f) after said pellets are dry, removing same from said screen and grinding them into a particulate mass.

2. A method according to claim 1 including the step of vacuuming the llama area to clear it off of all plant growth prior to the introduction of said llamas into said area.

3. A method according to claim 1 wherein step (f) is executed by feeding said pellets into a commercial grade coffee grinder.

4. A method according to claim 3 and including the further step of vacuuming loose airborne dust from the particulate mass produced by said grinder.

5. A method according to claim 4 and including the further step of collecting said dust, separating same from the air and outputting it for a recombination with the particulate mass from the grinding process.

6. A method according to claim 1 and including the further step of placing said at least one screen bottomed tray in a drying shed.

7. Structure according to claim 1 wherein said trays are plural and including the further step of filling at least one tray every day to begin drying the pellets thereon and accumulating trays for a selected number of days and then commencing step (f) on the pellets on trays which have been dried at least said selected number of days.

* * * * *